(12) United States Patent
Nimoda et al.

(10) Patent No.: US 11,003,611 B2
(45) Date of Patent: May 11, 2021

(54) INFORMATION PROCESSING SYSTEM, INFORMATION PROCESSING METHOD, AND SEMICONDUCTOR DEVICE

(71) Applicant: SOCIONEXT INC., Kanagawa (JP)

(72) Inventors: Eiichi Nimoda, Yokohama (JP); Seiji Goto, Yokohama (JP); Satoru Okamoto, Yokohama (JP); Shuichi Yamane, Yokohama (JP); Yasuo Nishiguchi, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 0 days.

(21) Appl. No.: 17/037,431

(22) Filed: Sep. 29, 2020

(65) Prior Publication Data

US 2021/0011873 A1    Jan. 14, 2021

Related U.S. Application Data

(63) Continuation of application No. PCT/JP2019/008292, filed on Mar. 4, 2019.

(30) Foreign Application Priority Data

Mar. 30, 2018    (JP) .............................. JP2018-067216

(51) Int. Cl.
*G06F 12/02* (2006.01)
*G06F 13/40* (2006.01)
(Continued)

(52) U.S. Cl.
CPC ............ *G06F 13/404* (2013.01); *G06F 12/10* (2013.01); *G06F 13/1668* (2013.01);
(Continued)

(58) Field of Classification Search
None
See application file for complete search history.

(56) References Cited

U.S. PATENT DOCUMENTS 6,654,818 B1 *  11/2003  Thurber ................. G06F 13/28
                                                    710/23
6,920,519 B1 *   7/2005  Beukema ............ G06F 12/0284
                                                    710/3
(Continued)

FOREIGN PATENT DOCUMENTS

EP          3276899 A1    1/2018
JP       2009-110032 A    5/2009
(Continued)

OTHER PUBLICATIONS

International Search Report and Written Opinion issued in corresponding International Patent Application No. PCT/JP2019/008292, dated Apr. 23, 2019, with parital English translation.

*Primary Examiner* — Cheng Yuan Tseng
(74) *Attorney, Agent, or Firm* — McDermott Will & Emery LLP

(57) ABSTRACT

A bridge apparatus includes slave circuits connected to each other via a bus. Each of the slave circuits is connected to one of master apparatuses, function as a slave for the master apparatus connected thereto, and performs communication in accordance with a protocol in which the number of masters in a system is restricted. Addresses of memories are respectively set in the slave circuits, and the memories are connected to the master apparatuses to which the slave circuits are respectively connected. When a first master apparatus accesses a memory connected to a second master apparatus by specifying a first address of the memory, the bridge apparatus causes the first master apparatus and the second master apparatus to communicate via a first slave circuit, a second slave circuit in which an address corresponding to the first address is set, and the bus, based on the addresses of the memories.

20 Claims, 10 Drawing Sheets

(51) Int. Cl.
*G06F 12/10* (2016.01)
*G06F 13/16* (2006.01)
*G06F 13/42* (2006.01)

(52) U.S. Cl.
CPC .... *G06F 13/4282* (2013.01); *G06F 2212/657* (2013.01); *G06F 2213/0026* (2013.01)

(56) References Cited

U.S. PATENT DOCUMENTS

| | | | |
|---|---|---|---|
| 7,480,303 | B1 | 1/2009 | Ngai |
| 8,554,963 | B1 * | 10/2013 | Shapiro ................ G06F 3/0688 710/23 |
| 8,860,741 | B1 * | 10/2014 | Juffa ................... G06F 12/0831 345/557 |
| 9,396,150 | B2 * | 7/2016 | Sato ................... G06F 13/4022 |
| 9,911,487 | B2 * | 3/2018 | Nieuwejaar ......... G06F 11/0727 |
| 10,754,808 | B2 * | 8/2020 | Sethi ................... G06F 13/4063 |
| 2010/0180062 | A1 | 7/2010 | Hidaka et al. |
| 2014/0269754 | A1 | 9/2014 | Eguchi et al. |
| 2015/0067229 | A1 | 3/2015 | Connor et al. |
| 2015/0261709 | A1 * | 9/2015 | Billi ..................... G06F 13/404 710/316 |
| 2016/0188511 | A1 | 6/2016 | Muraoka et al. |
| 2016/0188528 | A1 * | 6/2016 | Haghighi ............. G06F 3/0631 709/212 |
| 2018/0052793 | A1 | 2/2018 | Fang |

FOREIGN PATENT DOCUMENTS

| | | |
|---|---|---|
| WO | 2008/018485 A1 | 2/2008 |
| WO | 2013/136522 A1 | 9/2013 |
| WO | 2015/162777 A1 | 10/2015 |

\* cited by examiner

INFORMATION PROCESSING SYSTEM, INFORMATION PROCESSING METHOD, AND SEMICONDUCTOR DEVICE

CROSS-REFERENCE TO RELATED APPLICATION

This application is a continuation application of International Application PCT/JP2019/008292 filed on Mar. 4, 2019 and designated the U.S., which is based upon and claims the benefit of priority of the prior Japanese Patent Application No. 2018-067216, filed on Mar. 30, 2018, the entire contents of which are incorporated herein by reference.

FIELD

The embodiments discussed herein are related to an information processing system, an information processing method, and a semiconductor device.

BACKGROUND

As information processing systems advance in complexity and scale, information processing systems, each of which includes a plurality of system-on-chips (SoCs), have been proposed. As such an information processing system including a plurality of SoCs, there has been proposed a system in which a plurality of central processing units (CPUs) are connected to each other via a network and perform parallel processing, called a CPU cluster.

When a plurality of servers are connected to each other by using an Ethernet (registered trademark) switch, Peripheral Component Interconnect express (PCIe) has conventionally been used to reduce hardware of the Ethernet switch. In addition, a PCIe switch has conventionally been used to connect a plurality of processors and to enable one processor to access a memory connected to another processor. In addition, there has been proposed use of PCIe in place of Ethernet for communication between servers in a data center.

In the PCIe protocol, only a single master (referred to as a root complex) is allowed to be present in the system, and all the other devices need to be present as slaves (referred to as end points).

See, for example, U.S. Pat. No. 7,480,303, U.S. Patent Application Publication No. 2015/0067229, and International Publication Pamphlet No. 2013/136522.

As described above, in a protocol in which the number of masters in the system is restricted, such as in the PCIe protocol, it is difficult to directly connect devices (hereinafter referred to as master devices) such as personal computers (PCs) and CPUs having a master function. There is a method in which a plurality of master devices are connected via an Ethernet switch. However, in the case of an inexpensive Ethernet switch, there is a large delay including protocol overhead. For example, since the transmission source waits until the transmission source receives a response signal from a transmission destination to perform the next transmission, high-speed communication is not achieved.

Thus, the conventional techniques have a problem in that high-speed memory access between master devices is difficult.

SUMMARY

In one aspect, there is provided an information processing system including: a plurality of master apparatuses, each of which is configured to perform communication in accordance with a first protocol in which a number of masters in a system is restricted and each of which is configured to function as a master; and a bridge apparatus which includes a plurality of slave circuits that are connected to each other via a bus, each of the plurality of slave circuits being configured to be connected to one of the plurality of master apparatuses, function as a slave for a master apparatus connected thereto, and perform communication in accordance with the first protocol, addresses of memories being respectively set in the plurality of slave circuits, the memories being connected to the plurality of master apparatuses to which the plurality of slave circuits are respectively connected, wherein, among the plurality of master apparatuses, when a first master apparatus accesses a first memory connected to a second master apparatus different from the first master apparatus by specifying a first address of the first memory, the bridge apparatus allows communication between the first master apparatus and the second master apparatus via, among the plurality of slave circuits, a first slave circuit connected to the first master apparatus, a second slave circuit in which an address corresponding to the first address is set, and the bus, based on the addresses of the memories.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Embodiments will be described below with reference to the accompanying drawings.

First Embodiment

Figure 1:
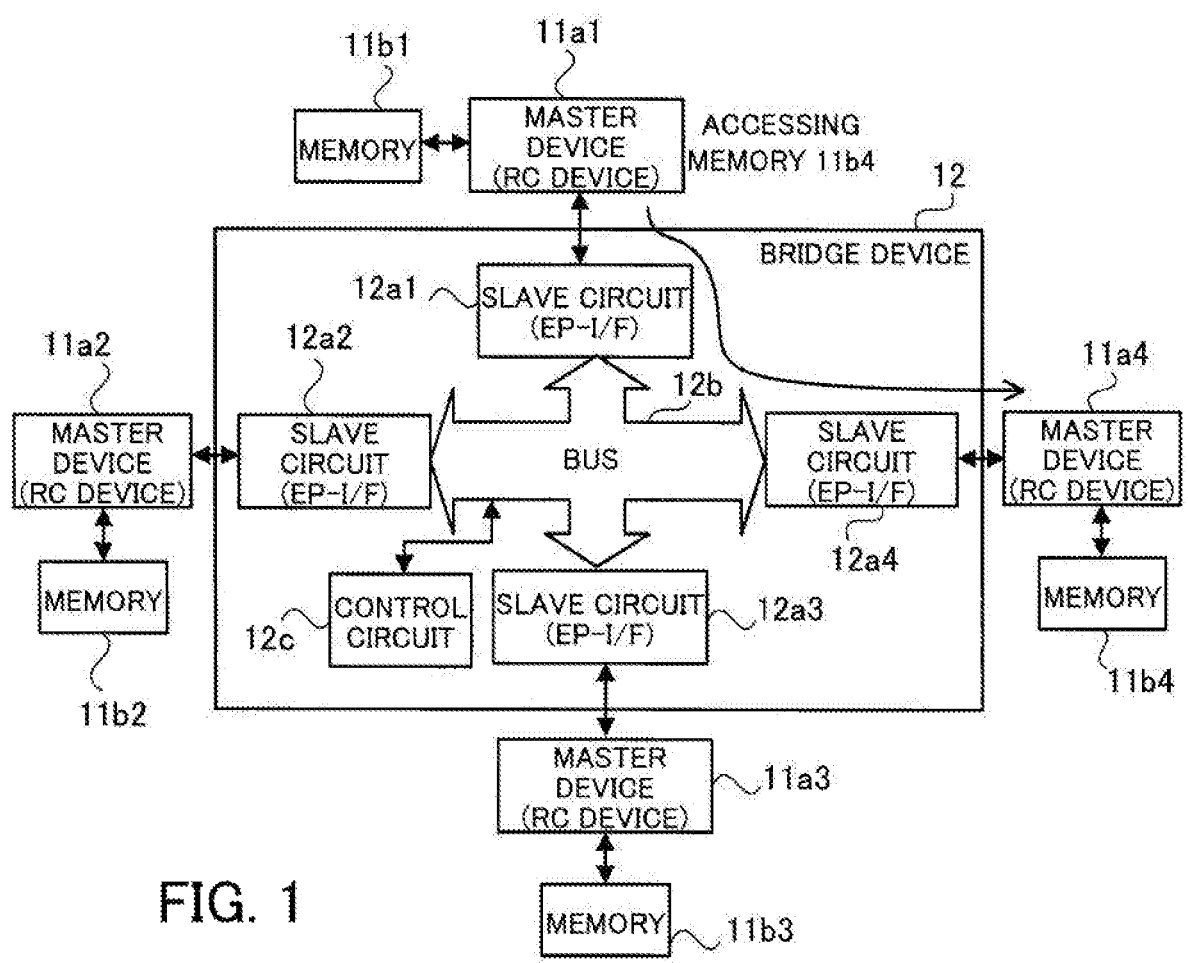
FIG. 1 illustrates an example of an information processing system according to a first embodiment.

FIG. 1 illustrates an example of an information processing system according to a first embodiment.

This information processing system 10 includes master devices 11a1 to 11a4 and a bridge device 12.

Each of the master devices 11a1 to 11a4 performs communication in accordance with a protocol in which the number of masters in the system is restricted and functions as a master. Examples of the protocol in which the number of masters in the system is restricted include the PCIe protocol and the Universal Serial Bus (USB) protocol. In FIG. 1, each of the master devices 11a1 to 11a4 that perform communication in accordance with the PCIe protocol is illustrated as "a root complex (RC) device". Each of the master devices 11a1 to 11a4 is, for example, a processor such as a CPU or a general-purpose computing on graphics processing unit (GPGPU), a SoC including a processor, or a computer.

The master device 11a1 is connected to a memory 11b1, and the master device 11a2 is connected to a memory 11b2. The master device 11a3 is connected to a memory 11b3, and the master device 11a4 is connected to a memory 11b4.

For example, each of the master devices 11a1 to 11a4 holds at least one of the addresses of the memories connected to the other master devices. When any one of the master devices 11a1 to 11a4 accesses a memory connected to any one of the other master devices, the accessing master device specifies the address of this memory.

The above addresses are serially numbered in the information processing system 10. Namely, the addresses of the individual memories in the information processing system 10 are defined in a single address space. Each of the master devices 11a1 to 11a4 may additionally define the address of the corresponding one of the memories 11b1 to 11b4 by using another address (a local address), which is used by the corresponding one of the master devices 11a1 to 11a4 for accessing the memory connected thereto. In this case, for example, each of the master devices 11a1 to 11a4 uses an address translation circuit to perform address translation based on information indicating a correspondence relationship between the corresponding local address and the address defined in the above single address space. For example, the address translation circuit is a memory management unit (MMU).

For example, each of the memories 11b1 to 11b4 may be a volatile semiconductor memory such as a dynamic random access memory (DRAM) or may be a non-volatile storage such as a flash memory. Each of the memories 11b1 to 11b4 may be provided in plurality.

For example, the bridge device 12 is a one-chip SoC (a semiconductor device or a semiconductor integrated circuit) and includes slave circuits 12a1 to 12a4, a bus 12b, and a control circuit 12c.

The slave circuits 12a1 to 12a4 are connected to each other via the bus 12b. Each of the slave circuits 12a1 to 12a4 is connected to one of the master devices 11a1 to 11a4, functions as a slave for the master device connected thereto, and performs communication in accordance with the above protocol in which the number of masters in the system is restricted. In the example in FIG. 1, the slave circuit 12a1 is connected to the master device 11a1, and the slave circuit 12a2 is connected to the master device 11a2. The slave circuit 12a3 is connected to the master device 11a3, and the slave circuit 12a4 is connected to the master device 11a4. In FIG. 1, each of the slave circuits 12a1 to 12a4 that perform communication in accordance with the PCIe protocol is illustrated as "end point-interface (EP-I/F)".

The bus 12b is, for example, a bus that is compliant with a protocol such as Advanced Microcontroller Bus Architecture (AMBA). For example, the bridge device 12 internally performs mutual communication among the slave circuits 12a1 to 12a4 via the bus 12b in accordance with a protocol such as AMBA different from PCIe.

When a master device accesses a memory connected to another master device by specifying the address of the memory, the control circuit 12c refers to the address and performs control processing so that the two master devices communicate with each other via the slave circuits connected thereto and the bus 12b. For example, as needed, when the bridge device 12 is initialized, the control circuit 12c may set the addresses of the memories, which are connected to the master devices to which the respective slave circuits 12a1 to 12a4 are connected, in the slave circuits 12a1 to 12a4. For example, the set address of a memory includes the beginning and ending addresses of the memory. As described above, these addresses are numbered serially in the information processing system 10 and are defined in a single address space.

In this way, for example, when the master device 11a1 accesses the memory 11b4 by specifying the address of the memory 11b4 connected to the master device 11a4 as illustrated in FIG. 1, the slave circuit 12a4 in which an address corresponding to the address is set communicates with the master device 11a4. Namely, the bridge device 12 controls the access from the master device 11a1 to the memory 11b4 connected to the master device 11a4 via the slave circuits 12a1 and 12a4 and the bus 12b by referring to the above single address space, for example. Thus, the master device 11a1 and 11a4 are able to communicate with each other via the slave circuits 12a1 and 12a4 and the bus 12b.

The control circuit 12c is, for example, a microcontroller, a CPU, or a CPU having a plurality of CPU cores.

In the above information processing system 10, the master devices 11a1 to 11a4 are connected to each other via the bridge device 12 in which the slave circuits 12a1 to 12a4 are connected to each other via the bus 12b. The communication between the master devices 11a1 to 11a4 and the slave circuits 12a1 to 12a4 is performed in accordance with a protocol such as the PCIe protocol in which the number of masters in the system is restricted. Thus, the information processing system 10 achieves a better communication speed between a plurality of master devices, compared with a system in which a plurality of master devices are connected to each other by using an Ethernet switch that causes, for example, a delay including protocol overhead. Consequently, high-speed memory access between master devices is achieved.

In the above example, the four master devices 11a1 to 11a4 and the four slave circuits 12a1 to 12a4 are used. However, as long as a plurality of master devices and a plurality of slave circuits are used, the number of master devices and the number of slave circuits are not limited to any particular number. In addition, a slave device serving as a slave may be connected to the bridge device 12. In this case, the bridge device 12 is provided with a master circuit that is connected to the slave device and the bus 12b and that functions as a master.

Second Embodiment

Figure 2:
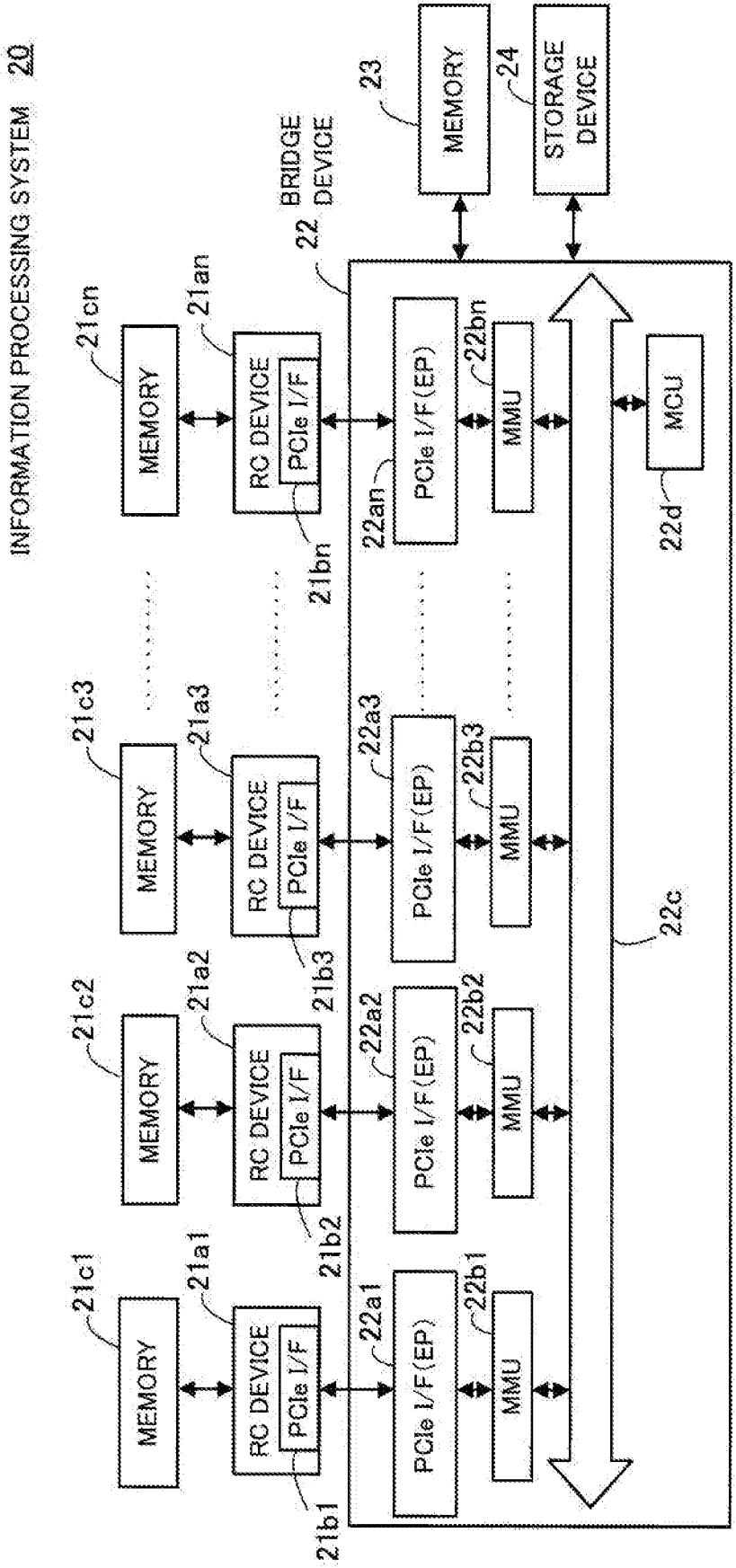
FIG. 2 illustrates an example of an information processing system according to a second embodiment.

FIG. 2 illustrates an example of an information processing system according to a second embodiment.

This information processing system 20 according to the second embodiment includes RC devices 21a1 to 21an, a bridge device 22, a memory 23, and a storage device 24.

The RC devices 21a1 to 21an include PCIe interfaces (I/F) 21b1 to 21bn and perform communication in accordance with the PCIe protocol, which is an example of the protocols in which the number of masters is restricted. Each of the RC devices 21a1 to 21an is set to function as a root complex. For example, each of the RC devices 21a1 to 21an is a processor such as a CPU or a GPGPU, a SoC having a processor, or a computer.

A memory is connected to each of the RC devices 21a1 to 21an. In the example in FIG. 2, a memory 21c1 is connected to the RC device 21a1, and a memory 21c2 is connected to the RC device 21a2. A memory 21c3 is connected to the RC device 21a3, and a memory 21cn is connected to the RC device 21an.

For example, each of the RC devices 21a1 to 21an holds at least one of the addresses of the memories connected to the other RC devices. The memories 21c1 to 21cn may hold these addresses. Alternatively, other memories (or registers) that are not illustrated but included in the respective RC devices 21a1 to 21an may hold the addresses. When any one of the RC devices 21a1 to 21an accesses a memory connected to any one of the other RC devices, the accessing RC device specifies the address of this memory.

Each of the RC devices 21a1 to 21an may hold the address of the memory 23 or the storage device 24 connected to the bridge device 22. When any one of the RC devices 21a1 to 21an accesses the memory 23 or the storage device 24, the accessing RC device specifies the address of the memory 23 or the storage device 24.

The above addresses are serially numbered in the information processing system 20. Namely, the addresses of the individual memories in the information processing system 20 are defined in a single address space.

Each of the RC devices 21a1 to 21an may additionally define the address of the corresponding one of the memories 21c1 to 21cn by using a local address, which is used by the corresponding one of the RC devices 21a1 to 21an for accessing the memory connected thereto. In this case, for example, each of the RC devices 21a1 to 21an causes an address translation circuit to perform address translation based on information indicating a correspondence relationship between the corresponding local address and the address defined in the above single address space. For example, the address translation circuit is an MMU.

For example, each of the memories 21c1 to 21cn may be a volatile semiconductor memory such as a DRAM or may be a non-volatile storage such as a flash memory. Each of the memories 21c1 to 21cn may be provided in plurality.

The bridge device 22 is, for example, a one-chip SoC (a semiconductor device, a semiconductor integrated circuit) and includes PCIe interfaces 22a1 to 22an, each of which is set to function as an end point (denoted as EP in FIG. 2). In addition, the bridge device 22 includes MMUs 22b1 to 22bn, a bus 22c, and a micro control unit (MCU) 22d.

The PCIe interfaces 22a1 to 22an are connected to each other via the MMUs 22b1 to 22bn and the bus 22c. Each of the PCIe interfaces 22a1 to 22an is a circuit that is connected to one of the RC devices 21a1 to 21an, and each of these circuits is set to function as an end point for the RC device connected thereto.

In the example in FIG. 2, the PCIe interface 22a1 is connected to the RC device 21a1, and the PCIe interface 22a2 is connected to the RC device 21a2. In addition, the PCIe interface 22a3 is connected to the RC device 21a3, and the PCIe interface 22an is connected to the RC device 21an. Each of the RC devices 21a1 to 21an communicates with the corresponding one of the PCIe interfaces 22a1 to 22an in the bridge device 22 via the corresponding one of the PCIe interfaces 21b1 to 21bn in accordance with the PCIe protocol.

The MMUs 22b1 to 22bn are examples of address translation circuits and perform address translation based on memory map information in which, for example, addresses of the memories 21c1 to 21cn, the memory 23, and the storage device 24 are defined. In the example in FIG. 2, while each of the PCIe interfaces 22a1 to 22an is connected to one of the MMUs 22b1 to 22bn, the bridge device 22 may include a PCIe interface that is not connected to any MMU. In this case, the PCIe interface is directly connected to the bus 22c.

The bus 22c is, for example, a bus that is compliant with a protocol such as AMBA. For example, the bridge device 22 internally performs mutual communication among the PCIe interfaces 22a1 to 22an via the bus 22c in accordance with a protocol different from PCIe, such as AMBA.

When an RC device accesses a memory connected to another RC device by specifying the address of the memory, the MCU 22d refers to the address and performs control processing so that the two RC devices communicate with each other via the PCIe interfaces connected thereto and the bus 22c. For example, as needed, when the bridge device 22 is initialized, the MCU 22d may set the addresses of the memories, which are connected to the RC devices to which the PCIe interfaces 22a1 to 22an are connected, in the PCIe interfaces 22a1 to 22an. For example, the set address of a memory includes the beginning and ending addresses of the memory. As described above, these addresses are numbered serially in the information processing system 20 and are defined in a single address space.

For example, the memory 23 may be a volatile semiconductor memory such as a DRAM or may be a non-volatile storage such as a flash memory. The storage device 24 is, for example, an information storage device having a larger capacity than that of the memory 23. The storage device 24 is, for example, a solid state drive (SSD) memory. The memory 23 or the storage device 24 may be included in the bridge device 22. Both of the memory 23 and the storage device 24 may be provided in plurality.

Figure 3:
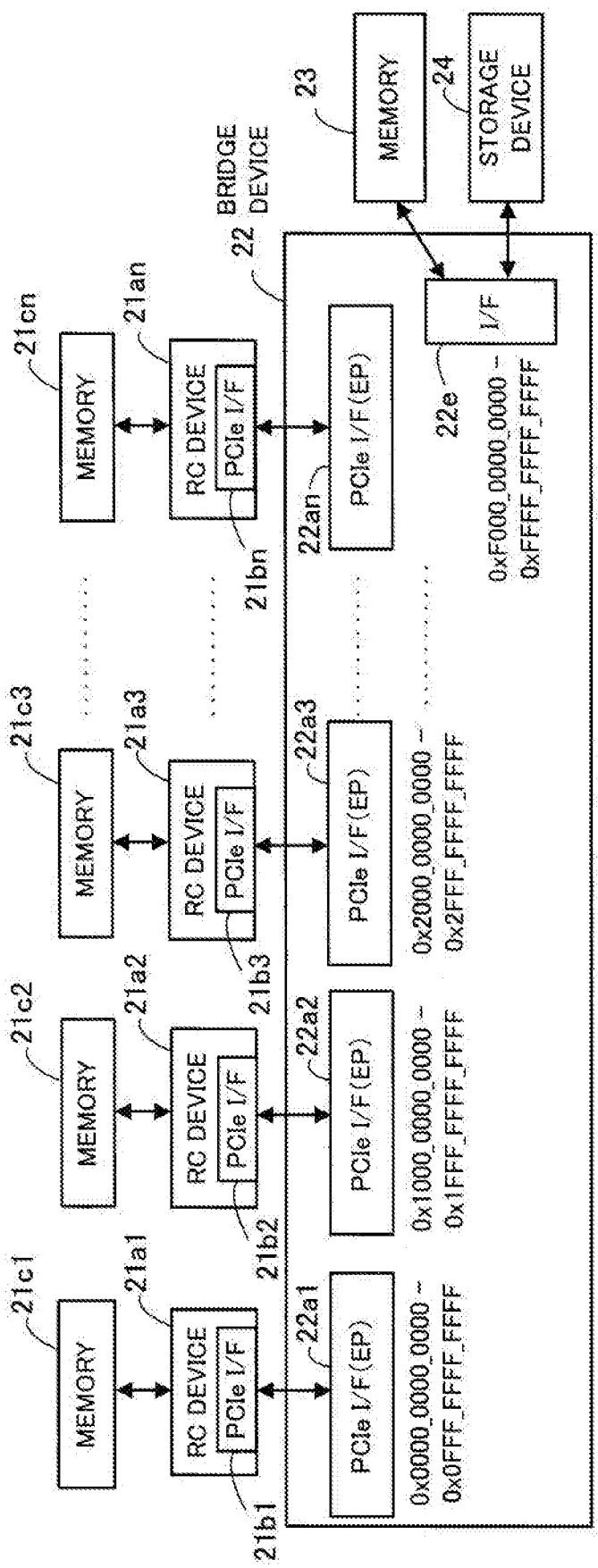
FIG. 3 illustrates an example of setting addresses in PCIe interfaces in a bridge device.

FIG. 3 illustrates an example of setting addresses in the PCIe interfaces in the bridge device. The MMUs 22b1 to 22bn, the bus 22c, and the MCU 22d are not illustrated in FIG. 3.

In the example in FIG. 3, the address of the memory 21c1 (0x0000_0000_0000 as the beginning address and 0x0FFF_FFFF_FFFF as the ending address) is set in the PCIe interface 22a1, and the address of the memory 21c2 (0x1000_0000_0000 as the beginning address and 0x1FFF_FFFF_FFFF as the ending address) is set in the PCIe interface 22a2. In addition, the address of the memory 21c3 (0x2000_0000_0000 as the beginning address and 0x2FFF_FFFF_FFFF as the ending address) is set in the PCIe interface 22a3.

While not illustrated in FIG. 2, an interface 22e that connects the memory 23 and the storage device 24 to the bus 22c is illustrated in FIG. 3. The address of the memory 23 or the storage device 24 (0xF000_0000_0000 as the beginning address and 0xFFFF_FFFF_FFFF as the ending address) is set in the interface 22e.

Figure 4:
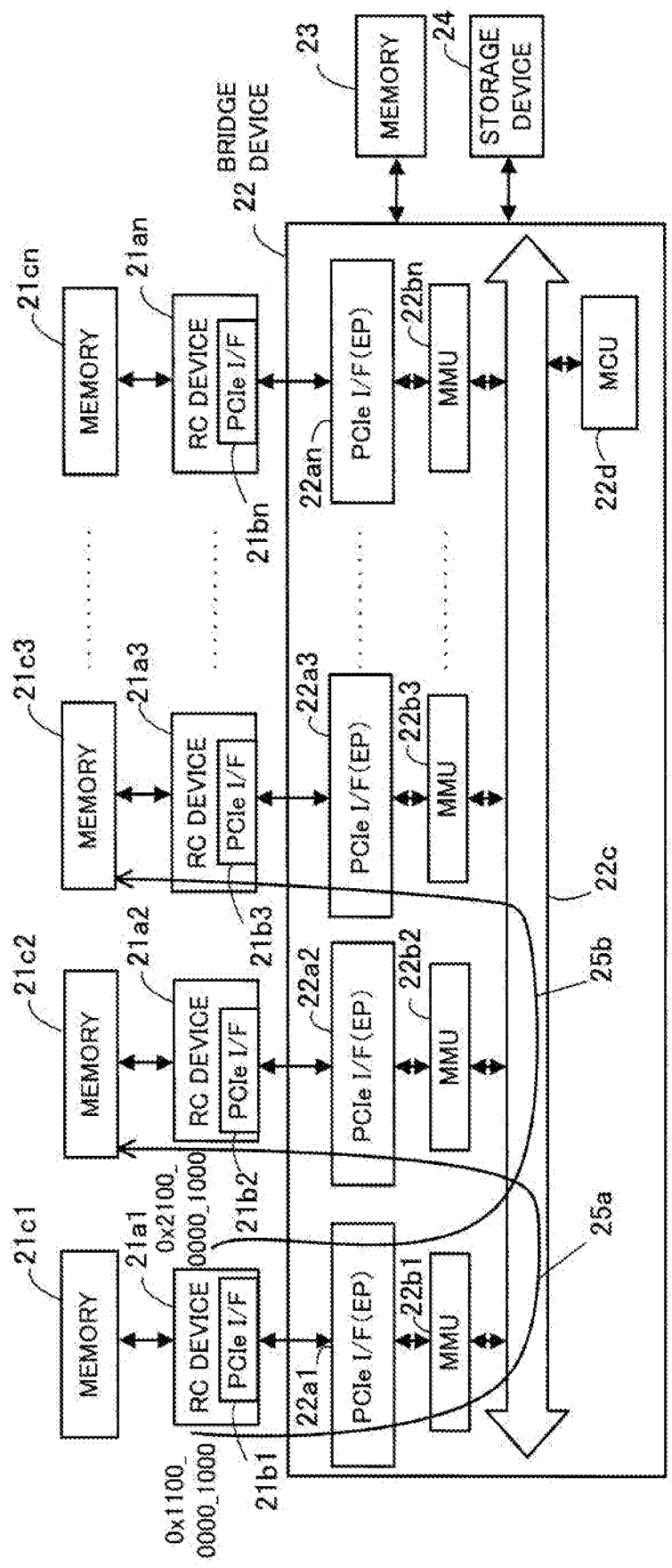
FIG. 4 illustrates examples of a memory access path between different RC devices.

FIG. 4 illustrates examples of a memory access path between different RC devices.

When the addresses are set in the PCIe interfaces 22a1 to 22an as illustrated in FIG. 3 and when the RC device 21a1 accesses an address "0x1100_0000_1000", a path as indicated by an arrow 25a is used. Namely, when the RC device 21a1 specifies the above address of the memory 21c2 connected to the RC device 21a2, the PCIe interface 22a2 in which an address corresponding to the address is set communicates with the RC device 21a2. For example, by referring to the above single address space, the bridge device 22 controls the access from the RC device 21a1 to the memory 21c2 connected to the RC device 21a2 via the PCIe interfaces 22a1 and 22a2 and the bus 22c. Thus, the RC devices 21a1 and 21a2 are able to communicate with each other via the PCIe interfaces 22a1 and 22a2 and the bus 22c.

In addition, when the RC device 21a1 accesses an address "0x2100_0000_1000", a path as indicated by an arrow 25b is used. Namely, when the RC device 21a1 specifies the above address of the memory 21c3 connected to the RC device 21a3, the PCIe interface 22a3 in which an address corresponding to the address is set communicates with the RC device 21a3. For example, by referring to the above single address space, the bridge device 22 controls the access from the RC device 21a1 to the memory 21c3 connected to the RC device 21a3 via the PCIe interfaces 22a1 and 22a3 and the bus 22c. Thus, the RC devices 21a1 and 21a3 are able to communicate with each other via the PCIe interfaces 22a1 and 22a3 and the bus 22c.

While not illustrated, when the RC device 21a1 specifies the address of the memory 23 or the storage device 24, the interface 22e in FIG. 3 in which an address corresponding to the address is set accesses the memory 23 or the storage device 24.

As described above, each of the RC devices 21a1 to 21an is able to treat the memories 21c1 to 21cn, the memory 23, and the storage device 24 as a single shared memory.

Figure 5:
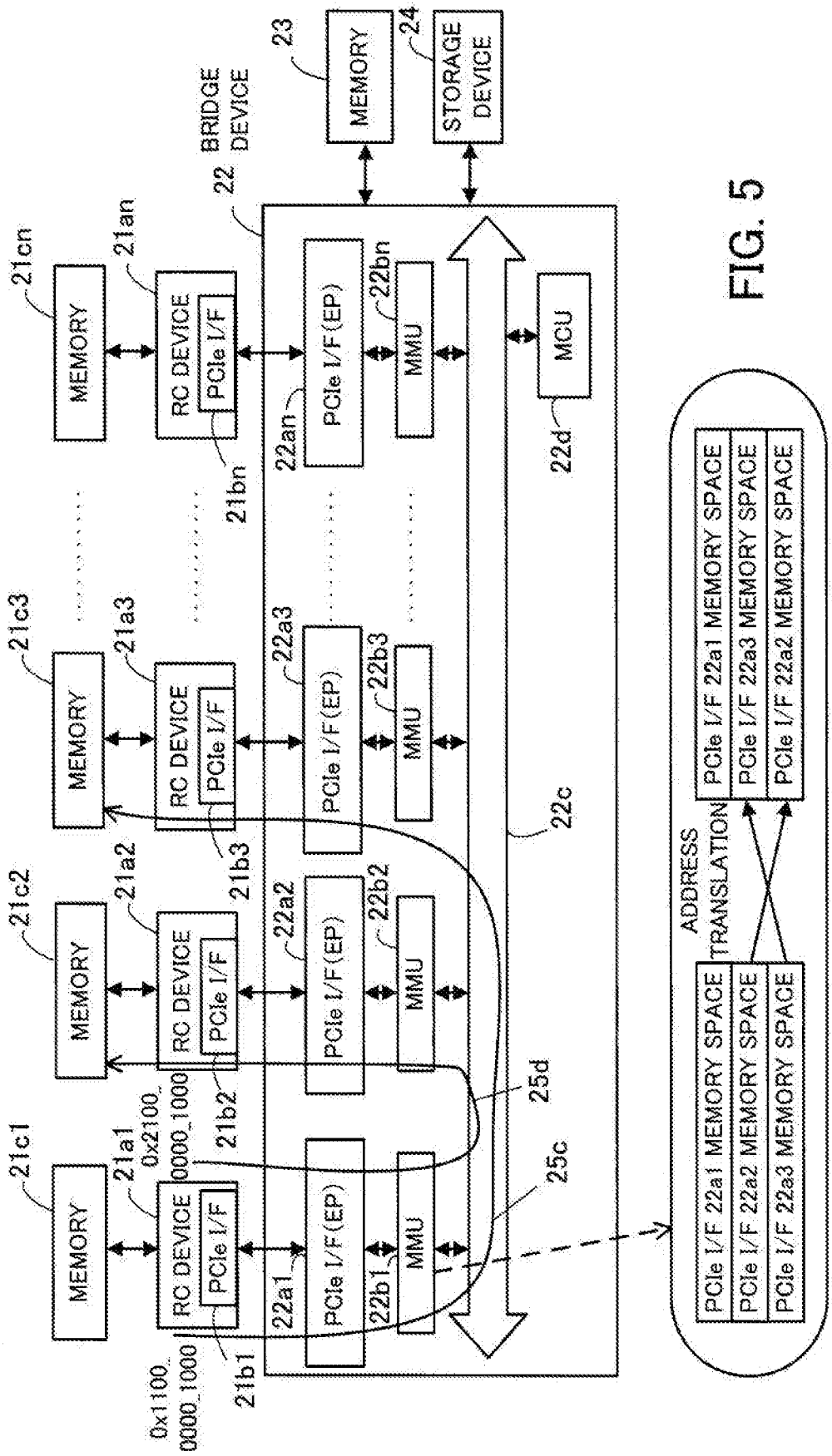
FIG. 5 illustrates an operation example of an MMU.

FIG. 5 illustrates an operation example of an MMU.

For example, as illustrated in FIG. 5, the MMU 22b1 performs address translation in such a manner that the memory spaces corresponding to the addresses set in the respective PCIe interfaces 22a2 and 22a3 are switched.

As a result, when the RC device 21a1 specifies and accesses the address set in the PCIe interface 22a2, the MM 22b1 translates the address into the address set in the PCIe interface 22a3. Thus, as illustrated in FIG. 5, when the RC device 21a1 specifies and accesses the address "0x1100_0000_1000" set in the PCIe interface 22a2, the RC device 21a1 accesses the address of the memory 21c3 by using a path indicated by an arrow 25c.

In addition, when the RC device 21a1 specifies and accesses the address set in the PCIe interface 22a3, the MM 22b1 translates the address into the address set in the PCIe interface 22a2. Thus, as illustrated in FIG. 5, when the RC device 21a1 specifies and accesses the address "0x2100_0000_1000" set in the PCIe interface 22a3, the RC device 21a1 accesses the address of the memory 21c2 by using a path indicated by an arrow 25d.

As described above, since the bridge device 22 includes the MMUs 22b1 to 22bn, the bridge device 22 is able to change the memory that the RC devices 21a1 to 21an access. In this way, for example, when an RC device connected to a memory as an access destination has malfunctioned, the access destination is switched to a memory connected to a normal RC device.

The above setting for the address translation is performed, for example, when the bridge device 22 is initialized.

Hereinafter, an operation of the information processing system 20 according to the second embodiment will be described.

Figure 6:
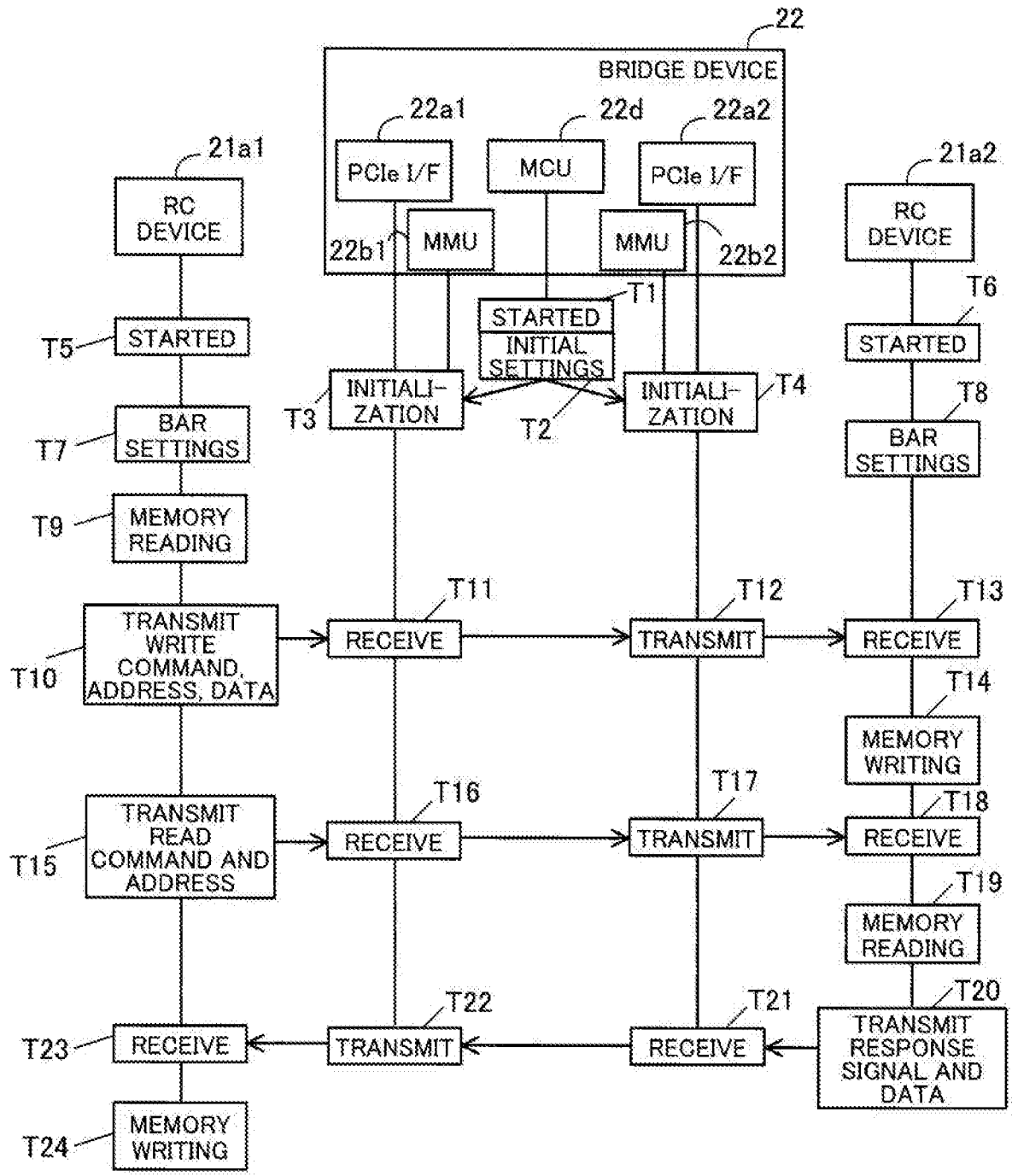
FIG. 6 is a sequence diagram illustrating an example of a memory access operation between two RC devices in the information processing system according to the second embodiment.

FIG. 6 is a sequence diagram illustrating an example of a memory access operation between two RC devices in the information processing system according to the second embodiment. FIG. 6 illustrates a memory access operation between the RC devices 21a1 and 21a2 illustrated in FIG. 2.

When the MCU 22d of the bridge device 22 is started (T1), the MCU 22d performs initial settings on the PCIe interfaces 22a1 and 22a2 and the MMUs 22b1 and 22b2 (T2). Consequently, the PCIe interfaces 22a1 and 22a2 and the MMUs 22b1 and 22b2 are initialized (T3 and T4).

The initial settings on the PCIe interfaces 22a1 and 22a2 are performed based on the addresses of the memories 21c1 and 21c2 connected to the RC devices 21a1 and 21a2. For example, the MCU 22d sets the address of the memory 21c1 in the PCIe interface 22a1. In addition, the MCU 22d sets the address of the memory 21c2 in the PCIe interface 22a2.

The following description assumes that the MMUs 22b1 and 22b2 do not perform the address translation as described above.

As illustrated in FIG. 6, when the RC devices 21a1 and 21a2 are started (T5 and T6), the RC devices 21a1 and 21a2 perform base address register (BAR) settings for storing the addresses of the memories to be accessed (T7 and T8).

To write data stored in the memory 21c1 connected to the RC device 21a1 into the memory 21c2 connected to the RC device 21a2, first, the RC device 21a1 reads the data from the memory 21c connected thereto (T9). Next, the RC device 21a1 transmits a write command, the address of the memory 21c2 as the write destination, and the data to the PCIe interface 22a1, which is an end point (T10). Next, the PCIe interface 22a1 receives these items of information (T11).

The PCIe interface 22a2 in which the address of the memory 21c2 is set receives the write command, the address, and the data via the bus 22c and transmits these items of information to the RC device 21a2 (T12).

When the RC device 21a2 receives the write command, the address, and the data (T13), the RC device 21a2 writes the received data in the received address (or in a local address obtained by translating the received address) in the memory 21c2 (T14).

When the RC device 21a1 reads data stored in the memory 21c2 connected to the RC device 21a2, the RC device 21a1 transmits a read command and the address in which the data to be read is stored to the PCIe interface 22a1 (T15). The PCIe interface 22a1 receives these items of information (T16). The PCIe interface 22a2 receives the read command and the address via the bus 22c and transmits these items of information to the RC device 21a2 (T17).

When the RC device 21a2 receives the read command and the address (T18), the RC device 21a2 reads the data from the received address (or from a local address obtained by translating the received address) in the memory 21c2 (T19). Next, the RC device 21a2 transmits a response signal and the read data to the PCIe interface 22a2 (T20), and the PCIe interface 22a2 receives these items of information (T21). Upon receipt of the response signal and the read data via the bus 22c, the PCIe interface 22a1 transmits these items of information to the RC device 21a1 (T22).

When the RC device 21a1 receives the response signal and the read data (T23), the RC device 21a1 writes the data in the memory 21c1, for example (T24).

Figure 7:
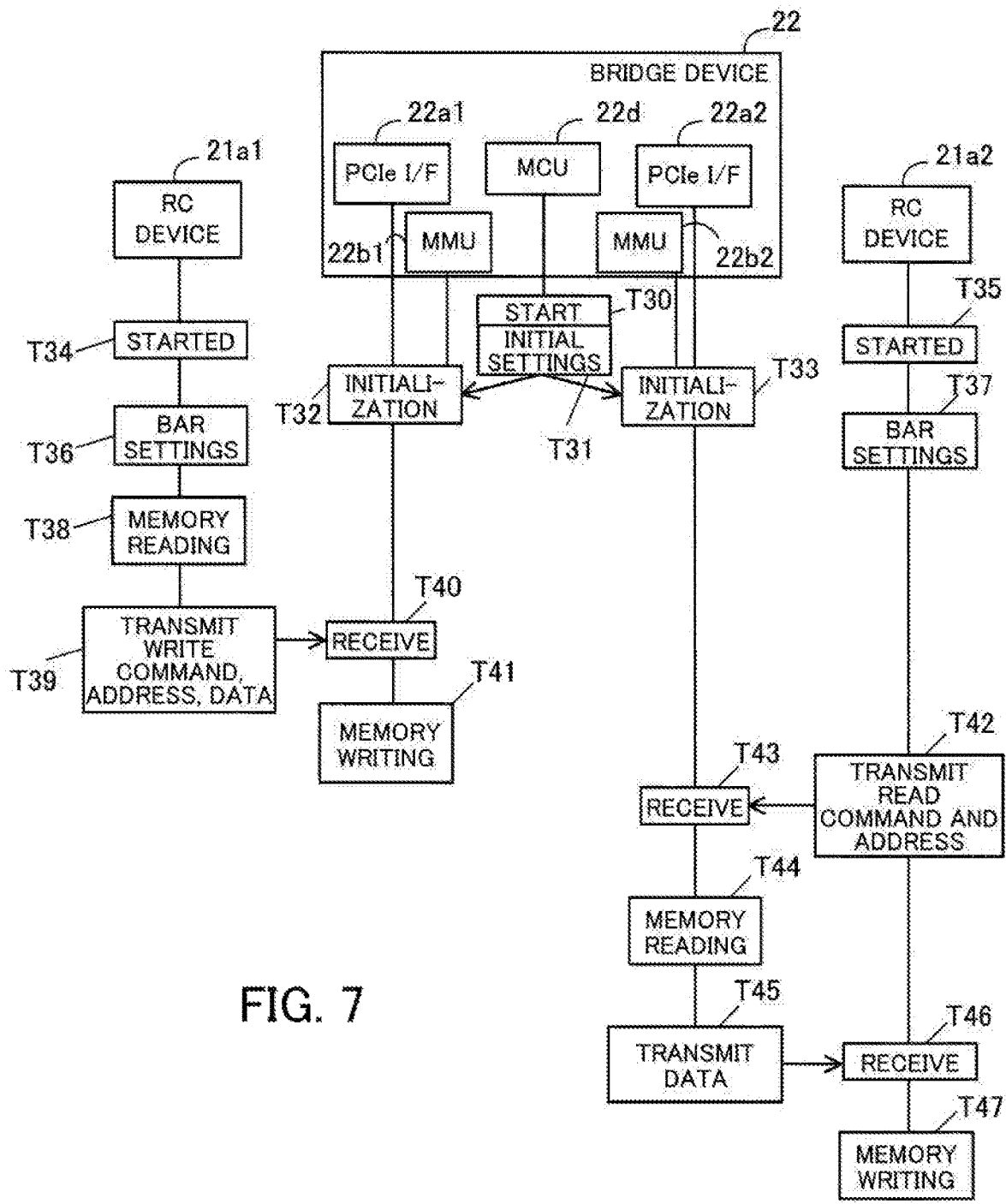
FIG. 7 is a sequence diagram illustrating an example of an operation performed when RC devices in the information processing system according to the second embodiment access a memory connected to the bridge device.

FIG. 7 is a sequence diagram illustrating an example of an operation performed when RC devices in the information processing system according to the second embodiment access a memory connected to the bridge device. FIG. 7 illustrates an operation performed when the RC devices 21a1 and 21a2 in FIG. 2 access the memory 23 or the storage device 24 connected to the bridge device 22.

T30 to T38 in FIG. 7 are the same as T1 to T9 illustrated in FIG. 6.

The RC device 21a1 transmits a write command, the address of the memory 23 or the storage device 24 as a write destination, and data to the PCIe interface 22a1 (T39), and the PCIe interface 22a1 receives these items of information (T40).

The PCIe interface 22a1 writes the received data in the received address of the memory 23 or the storage device 24 (or in a local address obtained by causing an MMU not illustrated to translate the received address) (T41) via the bus 22c and the interface 22e.

When the RC device 21a2 reads data stored in the memory 23 or the storage device 24, the RC device 21a2 transmits a read command and an address in which the data to be read is stored to the PCIe interface 22a2 (T42). The PCIe interface 22a2 receives these items of information (T43).

The PCIe interface 22a2 reads the data from the received address of the memory 23 or the storage device 24 (T44). Next, the PCIe interface 22a2 transmits the data that has been read and received via the bus 22c to the RC device 21a2 (T45).

When the RC device 21a2 receives the read data (T46), the RC device 21a2 writes the data in the memory 21c2, for example (T47).

In the above information processing system 20, the RC devices 21a1 to 21an are connected to each other via the bridge device 22 in which the PCIe interfaces 22a1 to 22an are connected to each other via the bus 22c. Consequently, the communication between the RC devices 21a1 to 21an and the PCIe interfaces 22a1 to 22an is performed in accordance with the PCIe protocol. Thus, the information processing system 20 achieves a better communication speed between a plurality of RC devices, compared with a system in which a plurality of RC devices are connected to each other by using an Ethernet switch that causes, for example, a delay including protocol overhead. Consequently, high-speed memory access between RC devices is achieved.

Third Embodiment

Figure 8:
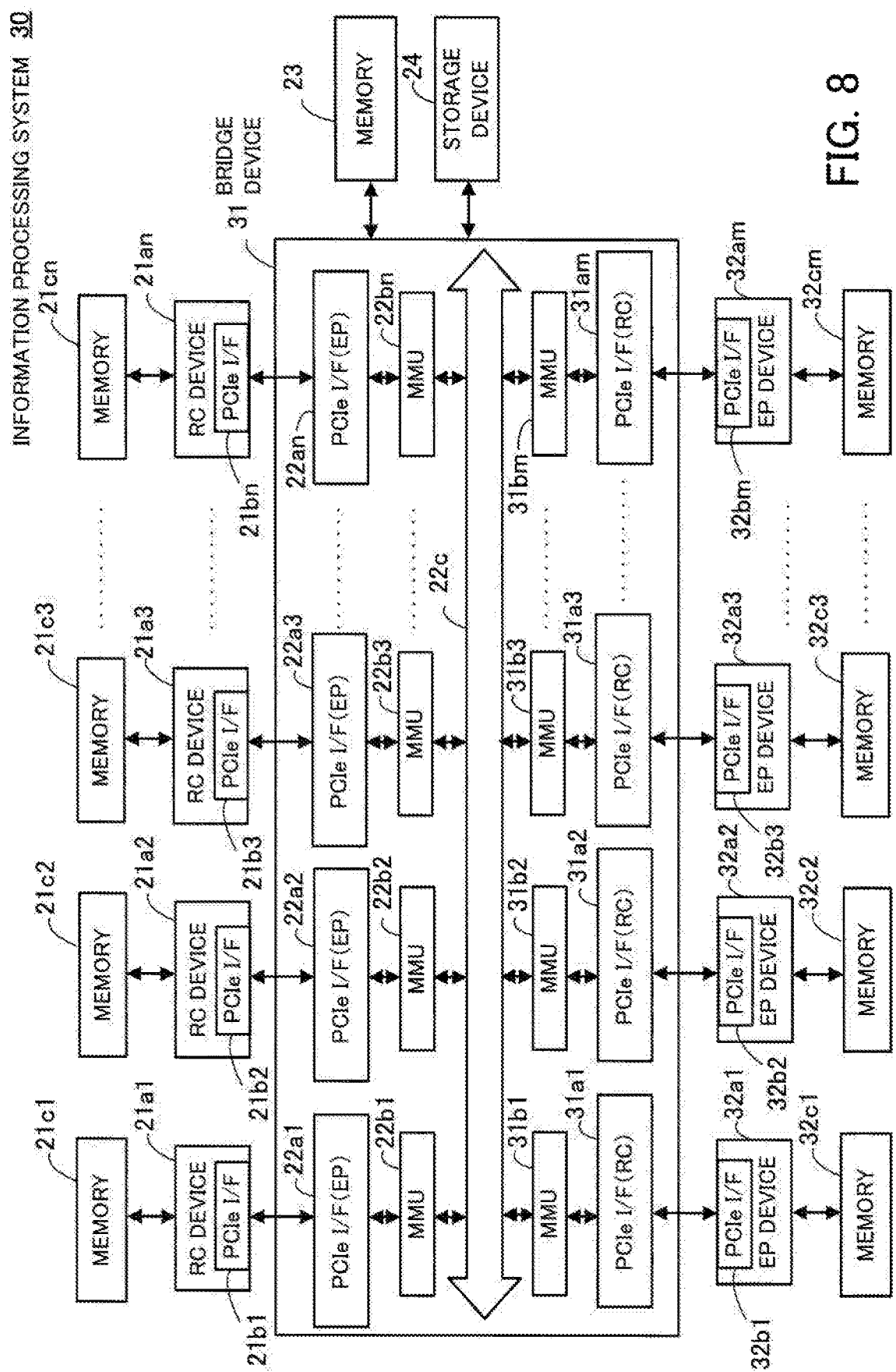
FIG. 8 illustrates an example of an information processing system according to a third embodiment.

FIG. 8 illustrates an example of an information processing system according to a third embodiment. Like elements illustrated in FIGS. 8 and 2 are denoted by like reference characters, and the MCU 22d is not illustrated in FIG. 8.

A bridge device 31 of this information processing system 30 includes PCIe interfaces 31a1 to 31am that function as root complexes, other than PCIe interfaces 22a1 to 22an that function as end points.

While the PCIe interfaces 31a1 to 31am are connected to a bus 22c via MMUs 31b1 to 31bm, respectively, the bridge device 31 may be configured without these MMUs 31b1 to 31bm.

The PCIe interfaces 31a1 to 31am are connected to EP devices 32a1 to 32am, respectively, that function as end points. The EP devices 32a1 to 32am include PCIe interfaces 32b1 to 32bm, respectively, and communicate with the PCIe interfaces 31a1 to 31am, respectively, in accordance with the PCIe protocol. In addition, the EP devices 32a1 to 32am are connected to memories 32c1 to 32cm, respectively.

As described above, the bridge device 31 may include the PCIe interfaces 31a1 to 31am that function as root complexes. In this way, a plurality of RC devices 21a1 to 21an and the plurality of EP device 32a1 to 32am are allowed to coexist on a single system.

In this information processing system 30, too, the RC devices 21a1 to 21an are able to directly access the individual memories 32c1 to 32cm. For example, by setting the address of the memory 32c2 in the PCIe interface 31a2, any one of the RC devices 21a1 to 21an is able to access the memory 32c2 by specifying the corresponding address.

Fourth Embodiment

Figure 9:
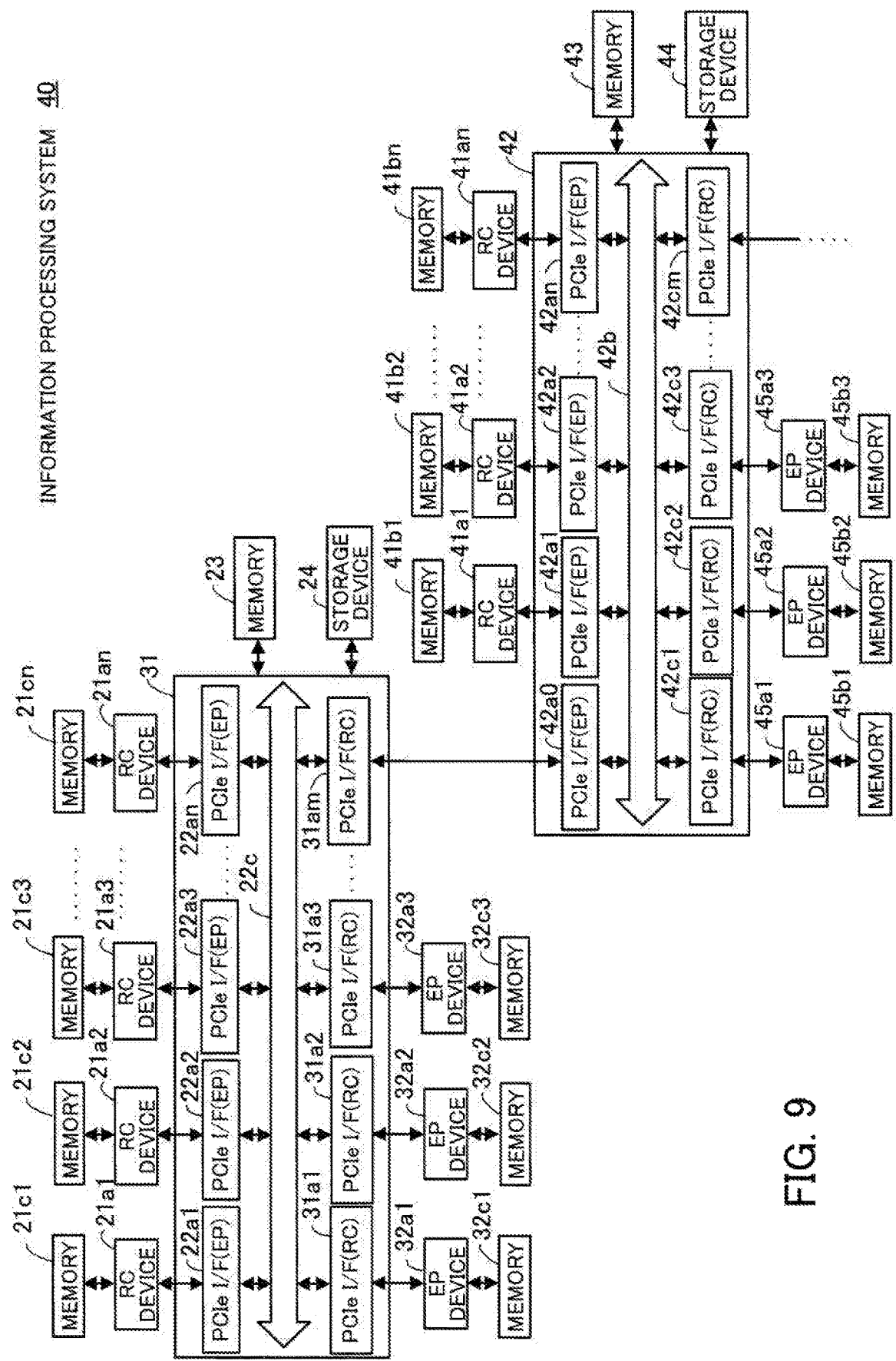
FIG. 9 illustrates an example of an information processing system according to a fourth embodiment.

FIG. 9 illustrates an example of an information processing system according to a fourth embodiment. Like elements illustrated in FIGS. 8 and 9 are denoted by like reference characters, and the MCU 22d, the MMUs 22b1 to 22bn, and the MMUs 31b1 to 31bm are not illustrated in FIG. 9.

This information processing system 40 includes bridge devices 31 and 42. In the example in FIG. 9, in the bridge device 31, a PCIe interface 31am that functions as a root complex is connected to a PCIe interface 42a0 that functions as an end point in the bridge device 42.

RC devices 41a1 to 41an that function as root complexes are connected to PCIe interfaces 42a1 to 42an, respectively, that function as end points in the bridge device 42. The RC devices 41a1 to 41an are connected to memories 41b1 to 41bn, respectively.

As is the case with the bridge device 31, the bridge device 42 includes PCIe interfaces 42c1 to 42cm that function as root complexes, other than the PCIe interfaces 42a0 to 42an.

The PCIe interfaces 42a0 to 42an and 42c1 to 42cm are connected to each other via a bus 42b. In addition, as is the case with the bridge device 31, a memory 43 and a storage device 44 are connected to the bridge device 42.

In addition, as is the case with the bridge device 31, while the bridge device 42 includes an MCU connected to the bus 42b, the MCU is not illustrated in FIG. 9. The bridge device 42 may be configured to include one or more NMUs.

In addition, in the example in FIG. 9, the PCIe interfaces 42c1 to 42c3 are connected to EP devices 45a1 to 45a3, respectively, and the EP devices 45a1 to 45a3 are connected to memories 45b1 to 45b3, respectively. The PCIe interface 42cm is connected to another bridge device not illustrated.

In this information processing system 40, too, the individual RC device is able to directly access another RC device, an EP device, a memory, or a storage device connected to a bridge. For example, the addresses in a memory space including the memories 41b1 to 41bn, 43, and 45b1 to 45b3 and the storage device 44 are set in the PCIe interface 31am, and the address of the memory 45b1 is set in the PCIe interface 42c1. For example, when any one of the RC devices 21a1 to 21an specifies the address of the memory 45b1, this RC device is able to access the memory 45b1 via the PCIe interfaces 31am, 42a0, and 42c1.

By connecting a plurality of bridge devices as described above, the bridge devices are connected in multiple stages. As a result, the scale of the information processing system 40 is increased.

Figure 10:
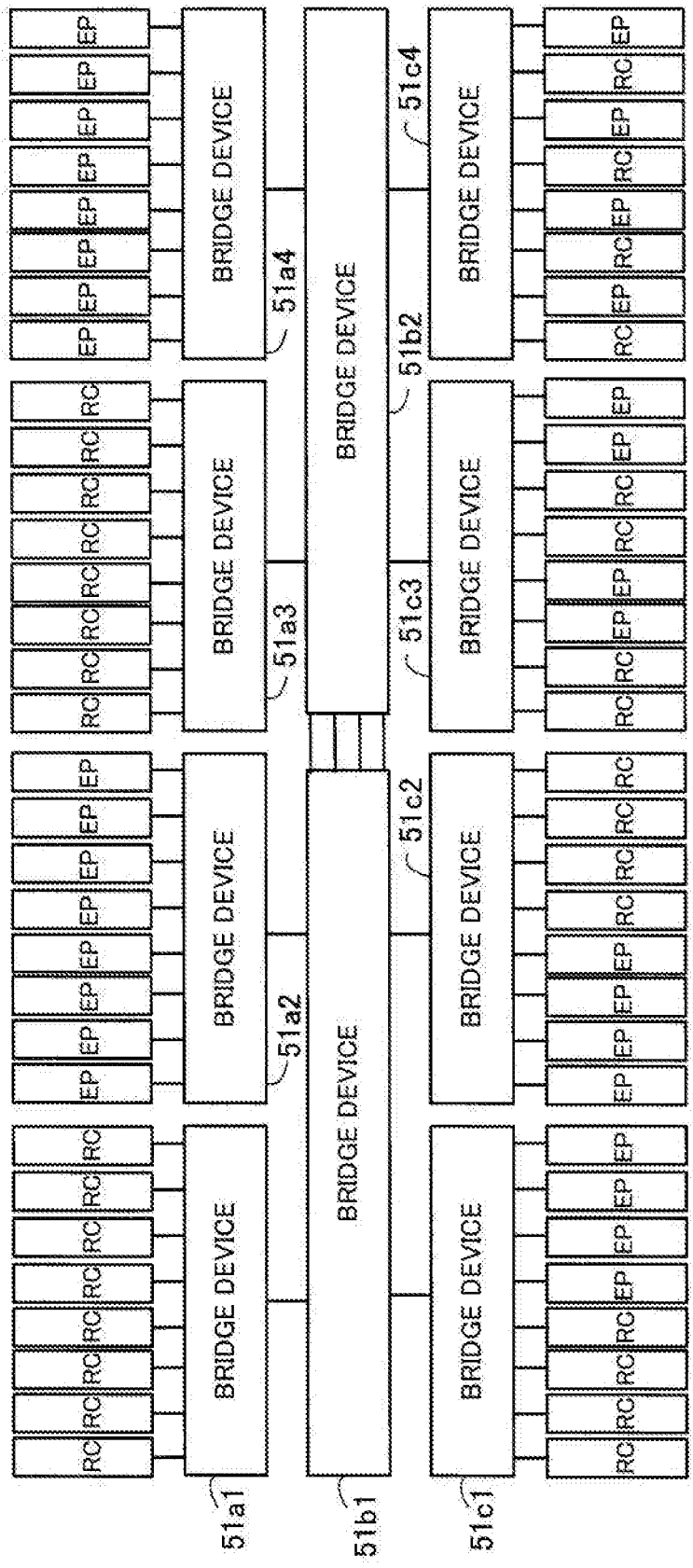
FIG. 10 illustrates an example of an information processing system obtained by connecting bridge devices in multiple stages.

FIG. 10 illustrates an example of an information processing system obtained by connecting bridge devices in multiple stages. In FIG. 10, an individual EP device is denoted by "EP", and an individual RC device is denoted by "RC".

This information processing system 50 includes bridge devices 51a1 to 51a4, 51b1, 51b2, and 51c1 to 51c4.

Each of the bridge devices 51a1 to 51a4 is connected to a plurality of EP devices or a plurality of RC devices. The bridge devices 51a1 and 51a2 are connected to the bridge device 51b1, and the bridge devices 51a3 and 51a4 are connected to the bridge device 51b2. The bridge devices 51b1 and 51b2 are connected to each other. The bridge device 51b1 is connected to the bridge devices 51c1 and 51c2, and the bridge device 51b2 is connected to the bridge devices 51c3 and 51c4. Each of the bridge devices 51c1 to 51c4 is connected to a plurality of EP devices or a plurality of RC devices.

Each of these bridge devices may be realized by using the bridge device 22 illustrated in FIG. 2 or the bridge device 31 illustrated in FIG. 8.

In one aspect, high-speed memory access between master devices is achieved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing system comprising:
   a plurality of master apparatuses, each of which is configured to perform communication in accordance with a first protocol in which a number of masters in a system is restricted and each of which is configured to function as a master; and
   a bridge apparatus which includes a plurality of slave circuits that are connected to each other via a bus, each of the plurality of slave circuits being configured to be connected to one of the plurality of master apparatuses, function as a slave for a master apparatus connected thereto, and perform communication in accordance with the first protocol, addresses of memories being respectively set in the plurality of slave circuits, the memories being connected to the plurality of master apparatuses to which the plurality of slave circuits are respectively connected,
   wherein, among the plurality of master apparatuses, when a first master apparatus accesses a first memory connected to a second master apparatus different from the first master apparatus by specifying a first address of the first memory, the bridge apparatus allows communication between the first master apparatus and the second master apparatus via, among the plurality of slave circuits, a first slave circuit connected to the first master apparatus, a second slave circuit in which an address corresponding to the first address is set, and the bus, based on the addresses of the memories.

2. The information processing system according to claim 1, wherein the addresses of the memories respectively connected to the plurality of master apparatuses are defined in a single address space in the information processing system.

3. The information processing system according to claim 2, wherein by referring to the single address space, the bridge apparatus controls the access from the first master apparatus to the first memory via the first slave circuit, the second slave circuit, and the bus.

4. The information processing system according to claim 1, wherein the bridge apparatus performs communication between the first slave circuit and the second slave circuit via the bus in accordance with a second protocol different from the first protocol.

5. The information processing system according to claim 1,
   wherein the bridge apparatus includes an address translation circuit that is configured to perform address translation, and
   wherein, when the address translation circuit translates the first address into a second address of a second memory connected to a third master apparatus different from the first master apparatus and the second master apparatus among the plurality of master apparatuses, the first master apparatus and the third master apparatus communicate with each other via the first slave circuit, the bus, a third slave circuit connected to the third master apparatus.

6. The information processing system according to claim 1, wherein the bridge apparatus includes a master circuit that is connected to the bus and is configured to function as the master.

7. The information processing system according to claim 1, wherein the bridge apparatus includes an interface circuit that is connected to the bus and configured to be connected to another bridge apparatus and function as the master or the slave.

8. The information processing system according to claim 1, wherein the bridge apparatus includes an interface circuit that is connected to the bus and that is configured to be connected to a third memory or a storage apparatus.

9. The information processing system according to claim 1, wherein the first protocol is a Peripheral Component Interconnect express (PCIe) protocol.

10. An information processing method used in a system including: a plurality of master apparatuses, each of which is configured to perform communication in accordance with a first protocol in which a number of masters in the system is restricted and each of which is configured to function as a master; and a bridge apparatus which includes a plurality of slave circuits that are connected to each other via a bus, each of the plurality of slave circuits being configured to be connected to one of the plurality of master apparatuses, function as a slave for a master apparatus connected thereto, and perform communication in accordance with the first protocol, addresses of memories being respectively set in the plurality of slave circuits, the memories being connected to the plurality of master apparatuses to which the plurality of slave circuits are respectively connected, the information processing method comprising:
   accessing, by a first master apparatus among the plurality of master apparatuses, a first memory connected to a second master apparatus different from the first master apparatus by specifying a first address of the first memory; and
   allowing, by the bridge apparatus, communication between the first master apparatus and the second master apparatus via, among the plurality of slave circuits, a first slave circuit connected to the first master apparatus, a second slave circuit in which an address corresponding to the first address is set, and the bus, based on the addresses of the memories.

11. The information processing method according to claim 10, wherein the addresses of the memories respectively connected to the plurality of master apparatuses are defined in a single address space in the information processing system.

12. The information processing method according to claim 10, wherein the bridge apparatus performs communication between the first slave circuit and the second slave circuit via the bus in accordance with a second protocol different from the first protocol.

13. The information processing method according to claim 10,
wherein the bridge apparatus includes an address translation circuit that is configured to perform address translation, and
wherein, when the address translation circuit translates the first address into a second address of a second memory connected to a third master apparatus different from the first master apparatus and the second master apparatus among the plurality of master apparatuses, the first master apparatus and the third master apparatus communicate with each other via the first slave circuit, the bus, a third slave circuit connected to the third master apparatus.

14. A semiconductor device that is configured to communicate with a plurality of master apparatuses, each of which is configured to perform communication in accordance with a first protocol in which a number of masters in a system is restricted and each of which is configured to function as a master, the semiconductor device comprising:
a bus; and
a plurality of slave circuits that are connected to each other via the bus, each of the plurality of slave circuits being configured to be connected to one of the plurality of master apparatuses, function as a slave for a master apparatus connected thereto, and perform communication in accordance with the first protocol, addresses of memories being respectively set in the plurality of slave circuits, the memories being connected to the plurality of master apparatuses to which the plurality of slave circuits are respectively connected,
wherein, among the plurality of master apparatuses, when a first master apparatus accesses a first memory connected to a second master apparatus different from the first master apparatus by specifying a first address of the first memory, the semiconductor device allows communication between the first master apparatus and the second master apparatus via, among the plurality of slave circuits, a first slave circuit connected to the first master apparatus, a second slave circuit in which an address corresponding to the first address is set, and the bus, based on the addresses of the memories.

15. The semiconductor device according to claim 14, wherein the addresses of the memories respectively connected to the plurality of master apparatuses are defined in a single address space in the information processing system.

16. The semiconductor device according to claim 14, wherein the semiconductor device performs communication between the first slave circuit and the second slave circuit via the bus in accordance with a second protocol different from the first protocol.

17. The semiconductor device according to claim 14, further comprising:
an address translation circuit that is configured to perform address translation,
wherein, when the address translation circuit translates the first address into a second address of a second memory connected to a third master apparatus different from the first master apparatus and the second master apparatus among the plurality of master apparatuses, the first master apparatus and the third master apparatus communicate with each other via the first slave circuit, the bus, a third slave circuit connected to the third master apparatus.

18. The semiconductor device according to claim 14, further comprising:
a master circuit that is connected to the bus and is configured to function as the master.

19. The semiconductor device according to claim 14, further comprising:
an interface circuit that is connected to the bus and configured to be connected to another semiconductor device and function as the master or the slave.

20. The semiconductor device according to claim 14, further comprising:
an interface circuit that is connected to the bus and that is configured to be connected to a third memory or a storage apparatus.

* * * * *